(No Model.)
W. R. STOKELY.
FRUIT BOX.
No. 488,040. Patented Dec. 13, 1892.
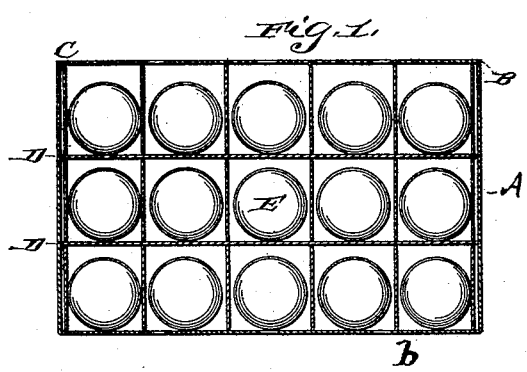
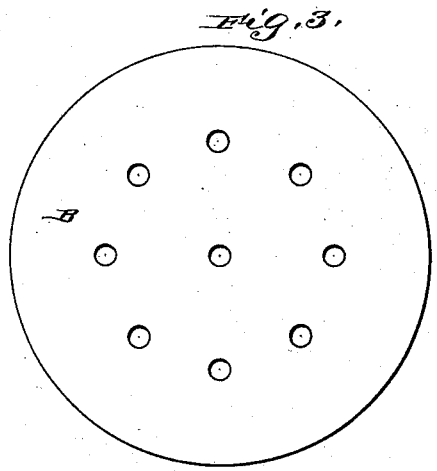
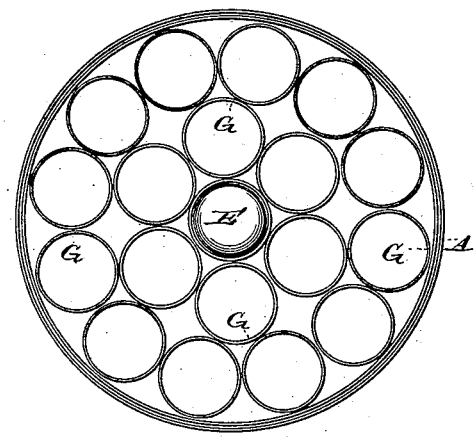
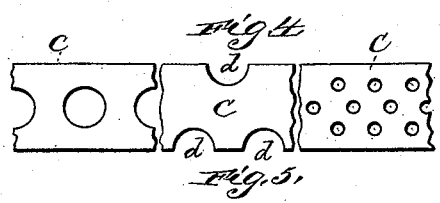
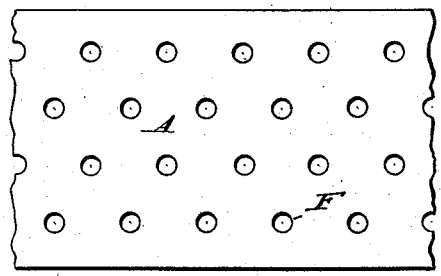
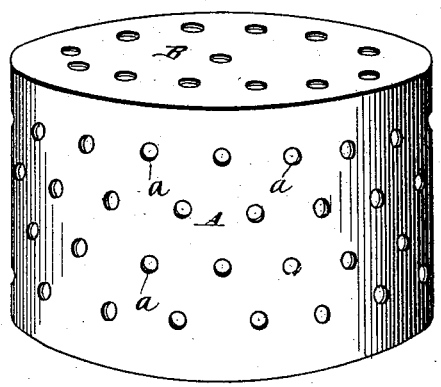
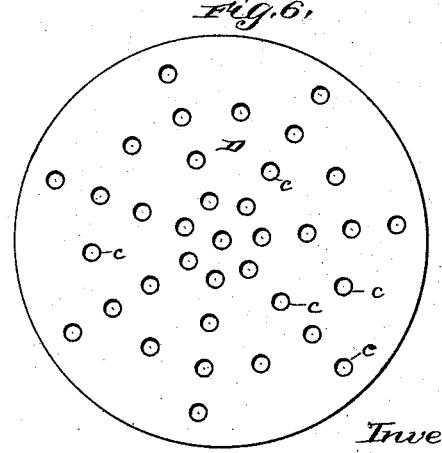
Witnesses:
A. J. Watts
H. M. Stokely
Inventor:
Wells R. Stokely

UNITED STATES PATENT OFFICE.

WELLS R. STOKELY, OF ANASTASIA, FLORIDA.

FRUIT-BOX.

SPECIFICATION forming part of Letters Patent No. 488,040, dated December 13, 1892.

Application filed September 8, 1891. Serial No. 405,145. (No model.)

*To all whom it may concern:*

Be it known that I, WELLS R. STOKELY, a citizen of the United States, residing at Anastasia, in the county of St. John's and State of Florida, have invented certain new and useful Improvements in Fruit or Vegetable Boxes; and I do declare the following to be a full, clear, and exact description of the invention, such as will enable others skilled in the art to which it appertains to make and use the same.

This invention relates to shipping-boxes for fruit and vegetables.

An important desideratum in this class of devices is to provide thorough ventilation and drainage and occupy as little space as possible and to obviate the bruising or crushing of the fruit or vegetables. To do this at a minimum expense is the prime object of my invention.

Other objects and advantages will appear from the following description and claims, when taken in connection with the annexed drawings, in which—

Figure 1 is a vertical diametrical sectional view of my improved shipping box or case, illustrating the same as filled with fruit. Fig. 2 is a plan view of the box or case with the cover removed. Fig. 3 is a plan view of the cover removed. Fig. 4 is a detail view of the ventilating-linings which serve the additional function of spacing and sustaining the horizontal partitions. Fig. 5 is a similar view on an enlarged scale. Fig. 6 is a plan view of one of the horizontal partitions to be used within the body of the box or case. Fig. 7 is a perspective view of the box or case.

In carrying out my invention I take a box or case A of cylindrical or circular contour and of a suitable size and provide the side walls with perforations $a$. These perforations are arranged in circular series from top to bottom of the box or case and so that said perforations in the series will assume a staggering position with relation to each other, for a purpose which will presently appear. This box is provided with a bottom $b$, which is secured to the body by screws or other suitable fastening devices, and is also perforated similar to the top B, as better shown in Fig. 3 of the drawings.

G indicates a strip of paper, pasteboard, wood, or other suitable material. This strip, which is provided with numerous perforations, should be sufficiently flexible and of a height or width corresponding with or slightly wider than the height of the fruit or vegetables to be packed. These strips G are designed to serve as separate or individual cells or receptacles for the fruit, as better shown in Fig. 2 of the drawings.

D indicates the horizontal partitions, which may be also formed of paper, wood, or other suitable material. These horizontal partitions, which are circular in outline, are provided with holes or perforations $c$, and are designed to be placed one upon each tier or layer of fruit or vegetables, so as to separate the same and aid in ventilating and draining each cell.

C indicates lining-strips. These strips, which are preferably formed of the same material as the partitions and cell-strips, are also perforated, so that their perforaitons or holes may coincide with the holes in the walls of the case or box, so that the passages may not be obstructed and free ventilation and drainage afforded for the fruit or vegetables. These strips are preferably provided in their edges with notches $d$, so as to more effectively drain the case or box, and, in addition to serving as linings, they should be sufficiently wide or high to support the partitions D, so as to prevent one tier or layer of fruit from crushing the layer beneath.

In packing fruit or vegetables I first take one of the articles and wrap one of the strips G around it in a tubular manner, leaving the top and bottom entirely open, and then place such inclosed article in the center of the bottom of the case or box. I then envelop or inclose other articles in cells in a similar manner and place them circularly around the first placed one or center one. It will be observed that six articles will entirely surround the center one, when twelve more may then be inclosed in a similar manner and placed to surround the six, as before described, and so on until the case or box has been compactly filled. It will be observed that in this way each fruit or vegetable is in a separate and ventilated compartment. The linings C, which are of a similar height to the cell-strips, should be placed on the inner side of the casing or box and one for each tier of fruit. The perforated partitions D are then placed horizontally upon the layer or tier of fruit, so that the marginal edges will rest upon the upper edge of the lining, which has been placed in position, and also the upper edges of the cells or receptacles, and will furnish a rest for the lower edge of the next succeeding lining, and consequently the cells, when the next tier of fruit may be prepared and laid as the first, and so on until the box or case has been filled.

It will be observed that the horizontal partitions are perforated, so as to ventilate the cells or cases from below and above. The cell-strips being perforated, will afford ventilation around the body or sides of the cells or cases, and the top and bottom, as well as the sides, of the box or casing being perforated will afford thorough ventilation in connection with the linings to the entire contents of the box or case.

While I have described specifically the parts and arrangement of the same in the exact construction shown and described, yet I would have it understood that there are many modifications which might be made in the construction and arrangement of the parts without departing from the spirit of my invention, and I reserve the right to make such changes and modifications as may fall within its scope. I attach importance, however, to the manner which I have shown of packing the fruit—viz., by placing one in the center, six around the one, twelve around the six, and eighteen around the twelve, and so on, increasing six to each tier, as by this arrangement in packing sized fruit I am enabled to greatly save or utilize space.

Having described my invention, what I claim is—

The improved case herein described for shipping perishable fruit in a compact manner and thoroughly draining and ventilating the same during transportation, consisting, essentially, of the circular case A, the top B, and the bottom b, respectively perforated, the individual perforated cells arranged in horizontal tiers and impinging against each other, so that one cell may be placed in the center and other cells grouped in circular courses about the same, the lining-strips C, surrounding the outer circular course of cells of each tier and having their bodies perforated to align with the perforations in the side wall of the case, and also having their edges notched to align with the perforations in the said side wall of the case and drain and ventilate the horizontal partitions, the said lining-strips C being of a height corresponding with that of the individual cells, and the aforesaid perforated horizontal partitions separating each course or tier and interposed between the contiguous edges of the lining-strips, substantially as specified.

In testimony whereof I affix my signature in presence of two witnesses.

WELLS R. STOKELY.

Witnesses:
   FRANK HAMBLEN,
   E. D. SABIN.